Patented June 9, 1953

2,641,597

UNITED STATES PATENT OFFICE 2,641,597

FURANS AND METHOD OF PRODUCTION

Moses Wolf Goldberg, Upper Montclair, and Albert Israel Rachlin, Hackensack, N. J., assignors to Hoffmann-La Roche Inc., Nutley, N. J., a corporation of New Jersey No Drawing. Application February 1, 1952,
Serial No. 269,618

15 Claims. (Cl. 260—251)

1

This invention relates to 2-phenyl-5-(R-phenyl) furans, wherein R is a member of the group consisting of 4,5-dihydro-2-imidazolyl, 4,5-dihydro-4(or 5)-lower alkyl-2-imidazolyl and 1,4,5,6-tetrahydro-2-pyrimidyl radicals. The invention also encompasses the salts of the aforesaid compounds with acids, and the methods for preparing such compounds. The compounds, in the free base form, can be represented by the following general formula:

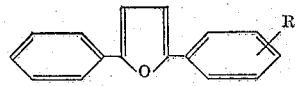

wherein R has the same meaning as hereinabove assigned thereto.

The new compounds are useful as antitrichomonal and antifungal agents, for example, against *Trichomonas vaginalis;* and the pathogenic fungi *Trichophyton mentagrophytes, Microsporon lanosum, Candida albicans,* and the like.

The 2-phenyl-5-(R-phenyl) furans comprising our invention can, in general, be prepared as follows:

An acetophenone is condensed with a phenylglyoxal, only one of these reagents containing a nuclear attached cyanoradical, so as to form a 1-benzoyl-2-(cyanobenzoyl) ethylene, which can be represented by the following formula:

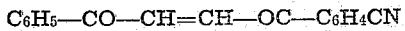

The latter is then treated with stannous chloride in the presence of concentrated hydrochloric acid and glacial acetic acid to form a 2-phenyl-5-cyanophenyl-furan. The thus formed cyano-substituted 2,5-diphenyl-furan is then reacted with a lower alkanol and hydrogen chloride to produce a 2-phenyl-5-[(α-imino lower alkoxymethyl)phenyl]furan hydrochloride. The latter is then reacted with a 1,2-diamino- or 1,3-diamino-alkane to form the 2-(phenyl)-5-(R-phenyl)furans comprising our invention. Thus, for example, when the 2-phenyl-5-[(α-imino lower alkoxymethyl)phenyl]furan hydrochloride is reacted with 1,2-diaminoethane, (ethylenediamine), a 2-phenyl-5-[(4,5 - dihydro-2-imidazolyl) phenyl]furan is obtained. When a 1,2-diamino lower alkyl substituted ethane is employed, e. g. 1,2-diaminopropane, a 2-phenyl-5-[(4,5-dihydro-4 (or 5) lower alkyl-2-imidazolyl)phenyl]-furan is produced, the lower alkyl group being in either the 4- or 5-position. When a 1,3-diamino alkane is employed, e. g. 1,3-diamino-propane, a 2-phenyl - 5-[(1,4,5,6 - tetrahydro-2-pyrimidyl) phenyl]furan is formed.

2

The 2-(phenyl)-5-(R-phenyl)furans are preferably produced in the form of their hydrochlorides which readily crystallize. The hydrochlorides can be readily converted into the free bases by treatment with a suitable alkali, for example, with an excess of sodium hydroxide solution. Any suitable method may be employed in preparing salts, for example, the salts may be formed by adding the appropriate acid or acid agent, or a solution thereof, to a solution of the free base, and recovering the salt from the solvent.

The preparation of various intermediates employed in our process, which are new, is illustrated by the following examples.

EXAMPLE A

*p-Cyanophenylglyoxal*

To a mixture of 500 cc. of dioxane and 20 cc. of water were added 56 grams of finely divided selenium dioxide. The mixture was stirred at 50° C. until the selenium dioxide had dissolved, and then 72.5 grams of p-cyanoacetophenone were added. The mixture was refluxed with stirring for 6 hours, during which time black metallic selenium precipitated. Stirring was continued without heating for 18 hours, and then the selenium was removed by filtration. The solvent was removed in vacuo and the hot residue was dissolved in 300 cc. of acetone. The acetone was flashed off and the residue was distilled on an oil bath. The p-cyanophenylglyoxal was obtained as a heavy, viscous oil boiling at 104–110° C./1.5 mm. A sample of the oily material was converted to the hydrate by trituration with water. After several crystallizations from nitromethane, the white crystalline p-cyanophenylglyoxal hydrate melted at 96–100° C.

EXAMPLE B

*m-Cyanophenylglyoxal*

To a mixture of 500 cc. of dioxane and 20 cc. of water were added 56 grams of finely divided selenium dioxide. The mixture was stirred at 50° C. until the selenium dioxide had dissolved, and then 72.5 grams of m-cyanoacetophenone were added. The mixture was refluxed with stirring for 6 hours, during which time black metallic selenium precipitated. Stirring was continued without heating for 18 hours, and then the selenium was removed by filtration through a thin pad of activated charcoal. The solvent was removed in vacuo, and the hot residue was dissolved in 300 cc. of acetone. The acetone was flashed off and the residue was distilled on an oil bath. A heavy viscous oil boiling at 123–126°

C. at 0.3 mm. was obtained. The hydrate prepared by treating the glyoxal with water was a white solid which melted at 54–57° C.

EXAMPLE C

1-benzoyl-2-(p-cyanobenzoyl) ethylene (1) A mixture of 79.4 grams of p-cyanophenylglycoxal, 60 grams of acetophenone, and 56.5 cc. of acetic anhydride was heated for 2.5 hours in an oil bath at 145–150° C. Vacuum was applied to the hot mixture to remove the acetic acid formed, and after standing for 24 hours at room temperature, the mixture was triturated with 30 cc. of absolute ethanol, filtered, washed twice with 30 cc. of absolute ethanol, and then with 30 cc. of ether. The yellow product thus obtained was recrystallized from 2,300 cc. of methanol, yielding 1-benzoyl-2-(p-cyanobenzoyl) ethylene, M. P. 143–145° C. in the form of yellow crystals.

(2) A mixture of 6.7 grams of phenylglyoxal, 7.25 grams of p-cyanoacetophenone, and 7 cc. of acetic anhydride was heated for 2.5 hours in an oil bath at 145–150° C. The reaction mixture was cooled at 4° C. for 24 hours. The mass which formed was filtered, and the product washed with 20 cc. of absolute ethanol. 1-benzoyl-2-(p-cyanobenzoyl)ethylene was thus obtained having a M. P. of 141–143° C.

EXAMPLE D

1-benzoyl-2-(m-cyanobenzoyl) ethylene (1) A mixture of 65.4 grams of m-cyanophenylglycoxal, 47 cc. of acetic anhydride, and 49.4 grams of acetophenone was heated for 2.5 hours in an oil bath at 145–150° C. Vacuum was applied to the hot mixture to remove the acetic acid formed, and after standing for 48 hours at room temperature, the mixture was triturated with 30 cc. of absolute ethanol, filtered, washed twice with 30 cc. of absolute ethanol, and then with 30 cc. of ether. The yellow product thus obtained was recrystallized from 1,200 cc. of methanol yielding 1-benzoyl-2-(m-cyanobenzoyl)ethylene, M. P. 126–127° C., in the form of yellow plates.

(2) A mixture of 15.2 grams of phenylglyoxal, 16.45 grams of m-cyanoacetophenone and 15 cc. of acetic anhydride was heated for 2.5 hours in an oil bath at 145–150° C. The reaction mixture was allowed to stand at room temperature for 24 hours. The semi-solid mass thus obtained was triturated with 20 cc. of absolute ethanol, filtered, washed with 15 cc. of absolute ethanol, and air dried. The crude product was recrystallized from 190 cc. of absolute ethanol, yielding 1-benzoyl-2-(m-cyanobenzoyl)ethylene, M. P. 126–127° C.

EXAMPLE E

2-phenyl-5-(m-cyanophenyl) furan

A mixture of 100 grams of stannous chloride dihydrate, 150 cc. of glacial acetic acid and 200 cc. of concentrated hydrochloric acid were refluxed for 5 minutes. To the hot solution were added 25 grams (0.096 mole) of 1-benzoyl-2-(m-cyanobenzoyl) ethylene and the mixture was refluxed for 10 minutes. The mixture was then cooled to 5° C. and the product which had solidified on cooling was filtered. The filter cake was sucked dry and then washed with 500 cc. of cold water and air-dried. The crude product was crystallized from 280 cc. of methanol, yielding 2-phenyl-5-(m-cyanophenyl) furan, M. P. 92.5–93° C.

EXAMPLE F

2-phenyl-5-(p-cyanophenyl) furan

A mixture of 100 grams of stannous chloride dihydrate, 150 cc. of glacial acetic acid and 200 cc. of concentrated hydrochloric acid was refluxed for 5 minutes. To the hot solution were added 25 grams (0.096 mole) of 1-benzoyl-2-(p-cyanobenzoyl) ethylene and the mixture was refluxed for 10 minutes. The reaction mixture was cooled to 5° C. and the product which had solidified was filtered. The filter cake was sucked dry and then washed with 500 cc. of cold water and air-dried. The 2-phenyl-5-(p-cyanophenyl) furan thus obtained was crystallized from 575 cc. of methanol, M. P. 122–124° C.

The following examples will serve to illustrate the preparation of the 2-phenyl-5-(R-phenyl)-furans, wherein R has the meaning hereinabove assigned thereto. It will be understood that the invention is intended to embrace the compounds in their various tautomeric and isomeric forms, and the claims are to be thus construed.

EXAMPLE 1

A solution of 5.7 grams (0.023 mole) of 2-phenyl-5-(m-cyanophenyl) furan in 25 cc. of chloroform and 1.2 cc. (0.03 mole) of methanol was cooled in an ice bath for 30 minutes. Anhydrous hydrogen chloride was passed into the cold solution for 7 minutes and the resulting dark-colored saturated solution was stored at about 4° C. for about 16 hours. The reaction mixture which now consisted of a thick slurry of orange crystals was heated in vacuo to 50° C. in order to remove the chloroform. The residue was triturated with 125 cc. of ether and the solid was filtered with suction. The filter cake was washed three times with 75 cc. portions of ether. The resulting compound was 2-phenyl-5-[m-(α-iminomethoxymethyl) phenyl]-furan hydrochloride.

A mixture of 3.2 grams (0.01 mole) of 2-phenyl-5 - [m(α-iminomethoxymethyl)phenyl]furan hydrochloride, 20 cc. of ethanol and 0.78 cc. (0.012 mole) of anhydrous ethylenediamine was refluxed for six hours. The clear solution was allowed to crystallize at about 4° C. A first crop of crystals having a M. P. of 274–276° C. was obtained. The mother liquor was evaporated to dryness and crystallization of the residue from 15 cc. of methanol yielded a second crop of crystals, M. P. 272–274° C. The two crops were combined and recrystallized from 35 cc. of methanol containing 1 cc. of 25 per cent methanolic hydrogen chloride. The crystals were 2-phenyl-5-[m-(4,5-dihydro-2-imidazolyl)-phenyl]furan hydrochloride, M. P. 276–278° C. They tend to retain methanol of crystallization. When crystallized from ethanol, the hydrochloride tends to retain ethanol of crystallization.

A methanol-water solution of 2-phenyl-5-[m-(4,5-dihydro-2-imidazolyl)phenyl]furan hydrochloride was treated with an excess of sodium hydroxide solution to obtain the free base. Recrystallized from methanol, the white crystalline 2 - phenyl - 5 - [m - (4,5 - dihydro - 2 - imidazolyl)phenyl]furan melted at 180–181° C. To 100 mg. of the free base dissolved in 3 cc. of methanol were added 3 drops of 85 per cent lactic acid. The solution was evaporated to dryness in vacuo and the residue was crystallized, first from ethanol-ether and then from acetonitrile. The lactate salt thus obtained melted at 158–160° C. The hydrobromide, prepared in a similar manner from the free base, by employing hydrogen bromide, and crystallized from aqueous methanol, tends to retain water of crystallization. It melts at 287–288° C.

EXAMPLE 2

A solution of 38 grams (0.155 mole) of 2-phenyl-5-(p-cyanophenyl)furan in 200 cc. of chloroform and 9.5 cc. (0.24 mole) of methanol was cooled in an ice bath for 30 minutes. Anhydrous hydrogen chloride was passed into the cold solution for 10 minutes and the resulting dark-colored saturated solution was stored at about 4° C. for about 16 hours. The reaction mixture was heated in vacuo at about 50° C. in order to remove the chloroform. The solid residue was triturated with 500 cc. of ether and the solid was filtered off with suction. The filter cake was washed with a total of 500 cc. of ether and air-dried. The cake consisted of 2-phenyl-5-[p-(α-iminomethoxymethyl)phenyl]furan hydrochloride.

A solution of 30.9 grams (0.099 mole) of 2-phenyl - 5 - [p - (α - iminomethoxymethyl) - phenyl]furan hydrochloride, 210 cc. of ethanol and 8.5 cc. of anhydrous ethylenediamine (0.13 mole) was stirred and refluxed for six hours. Within 15 minutes a crystalline solid started to appear and ammonia was liberated. The reaction mixture was cooled to about 4° C. and permitted to stand overnight. It was then filtered, washed with 25 cc. of cold ethanol and then 100 cc. of ether. Recrystallized from 700 cc. of methanol containing 25 cc. of 25 per cent methanolic hydrogen chloride, the 2-phenyl-5-[p - (4,5 - dihydro - 2 - imidazolyl)phenyl]furan hydrochloride thus obtained melted at 312–313° C. with decomposition.

A methanol-water solution of 2-phenyl-5-[p-(4,5-dihydro-2-imidazolyl)phenyl]furan hydrochloride was treated with an excess of sodium hydroxide solution to obtain the free base. Recrystallized from methanol, the crystalline free base, 2-phenyl-5-[p-(4,5-dihydro-2-imidazolyl)-phenyl]furan, melted at 203–204° C.

To a solution of 1.3 grams of 2-phenyl-5-[p-(4,5-dihydro-2-imidazolyl)phenyl]furan dissolved in 15 cc. of warm methanol was added 0.55 cc. of 85 per cent lactic acid. The solution was evaporated to dryness in vacuo and the solid residue was recrystallized from 15 cc. of methanol and 10 cc. of ether. 2-phenyl-5-[p-(4,5-dihydro-2-imidazolyl)phenyl]furan lactate was obtained in the form of pale yellow crystals, M. P. 197.5–198° C.

EXAMPLE 3

A mixture of 8.7 grams (0.028 mole) of 2-phenyl - 5 - [m - (α - iminomethoxymethyl) - phenyl]furan hydrochloride, 50 cc. of ethanol, and 2.7 cc. (0.034 mole) of 1,2-diaminopropane was refluxed for 6 hours. The solution was poured into a mixture of 500 cc. of water and 50 cc. of 4 N sodium hydroxide solution, and the resulting gummy precipitate was extracted into two 250 cc. portions of ether. After drying over sodium sulfate, the ether was removed from the combined extracts in vacuo. The oily residue, 2-phenyl - 5 - [m-(4,5 - dihydro-4(or 5)methyl-2-imidazolyl)phenyl]furan, was dissolved in 25 cc. of ethanol, and 10 cc. of 20 per cent ethanolic hydrogen chloride and 3 cc. of water were added. 90 cc. of ether were added to the alcoholic solution, and after cooling at 4° C., 2-phenyl-5-[m-(4,5-dihydro-4(or 5)methyl-2-imidazolyl)-phenyl]furan hydrochloride separated as a mass of almost white crystals. After filtering, drying and recrystallizing three times from moist ethanol and ether, the compound melted at 235–236° C.

EXAMPLE 4

A mixture of 10.5 grams (0.0335 mole) of 2-phenyl - 5 - [p - (α - iminomethoxymethyl) - phenyl]furan hydrochloride, 50 cc. of ethanol, and 3.2 cc. (0.038 mole) of 1,2-diaminopropane was stirred and refluxed for 6 hours. The solution, after being cooled at 4° C. deposited a mass of yellow crystals. The product was filtered, washed with cold ethanol, and dried. After recrystallization three times from alcohol, the 2-phenyl - 5 -[p - (4,5 - dihydro - 4(or 5)methyl - 2-imidazolyl)phenyl]furan hydrochloride was obtained, M. P. 284–286° C.

EXAMPLE 5

A mixture of 5 grams (0.016 mole) of 2-phenyl - 5 - [m - (α - iminomethoxymethyl) - phenyl]furan hydrochloride, 50 cc. of ethanol, and 2 cc. (0.024 mole) of 1,3-diaminopropane was refluxed for 6 hours. The solution was poured into a mixture of 500 cc. of water and 50 cc. of 4 N sodium hydroxide solution, and the resulting precipitate was extracted into two 250 cc. portions of ether. The ether extracts were dried over sodium sulfate, the drying agent was washed thoroughly with chloroform, and the combined extracts were concentrated in vacuo. The solid yellow residue, 2-phenyl-5-[m-(1,4,5,6-tetrahydro-2-pyrimidyl)phenyl]furan, was dissolved in 40 cc. of ethanol and 6 cc. of ethanolic hydrogen chloride. 160 cc. of ether were added to the alcoholic solution, and, after cooling at 40° C., 2-phenyl-5-[m-(1,4,5,6-tetrahydro-2-pyrimidyl)phenyl]furan hydrochloride separated as a mass of almost white crystals. After filtration, drying and recrystallizing four times from ethanol ether, the compound melted at 235° C. A sample of the compound when mixed with 2-phenyl-5-[m-(4,5-dihydro-4(or 5)methyl-2-imidazolyl)phenyl]furan hydrochloride melted at 213–218° C.

EXAMPLE 6

A mixture of 6.27 grams (0.02 mole) of 2-phenyl - 5 - [p - (α - iminomethoxymethyl) - phenyl]furan hydrochloride, 70 cc. of ethanol, and 2.2 cc. (0.026 mole) of 1,3-diaminopropane was stirred and refluxed for 6 hours. The solvent was removed in vacuo and the solid residue was dissolved in 80 cc. of ethanol. 20 cc. of ether were added and after cooling at 40° C. the 2-phenyl-5-[p-(1,4,5,6-tetrahydro-2-pyrimidyl)phenyl]furan hydrochloride separated as a mass of white crystals. After being filtered, washed with cool ethanol, dried, and recrystallized four times from moist ethanol-ether, the compound melted at 292–293° C.

This application is a continuation-in-part of our copending application Serial No. 197,492, filed on November 24, 1950.

We claim:

1. A compound of the class consisting of 2-phenyl-5-(R-phenyl)furans and the acid addition salts thereof, wherein R is a member of the group consisting of 4,5-dihydro-2-imidazolyl, 4,5-dihydro - C - lower alkyl - 2 - imidazolyl, and 1,4,5,6-tetrahydro-2-pyrimidyl radicals.

2. 2-phenyl-5-(R-phenyl)furans, wherein R is 4,5-dihydro-2-imidazolyl.

3. 2-phenyl-5-(R-phenyl)furans, wherein R is 4,5-dihydro-C-lower alkyl-2-imidazolyl.

4. 2-phenyl-5-(R-phenyl)furans, wherein R is 1,4,5,6-tetrahydro-2-pyrimidyl.

5. 2-phenyl-5-[m-(4,5-dihydro-2-imidazolyl)-phenyl]furan hydrochloride.

6. 2-phenyl-5-[p-(4,5-dihydro-2-imidazolyl)-phenyl]furan hydrochloride.

7. 2-phenyl-5-[m-(4,5-dihydro-C-methyl-2-imidazolyl)phenyl]furan hydrochloride.

8. 2-phenyl-5-[p-(4,5-dihydro-C-methyl-2-imidazolyl)phenyl]furan hydrochloride.

9. 2-phenyl-5-[m-(1,4,5,6-tetrahydro-2-pyrimidyl)phenyl]furan hydrochloride.

10. A process which comprises reacting a 2-phenyl-5-[(α-imino lower alkoxy methyl)phenyl]furan hydrochloride with a member of the group consisting of 1,2-diamino- and 1,3-diamino alkanes to form 2-phenyl-5-(R-phenyl)furans, wherein R is a member of the group consisting of 4,5-dihydro-2-imidazolyl, 4,5-dihydro-C-lower alkyl-2-imidazolyl, and 1,4,5,6-tetrahydro-2-pyrimidyl radicals.

11. A process for producing 2-phenyl-5-[m-(4,5-dihydro-2-imidazolyl)phenyl]furan hydrochloride which comprises reacting 2-phenyl-5-[m-(α-iminomethoxymethyl)phenyl]furan hydrochloride with ethylenediamine.

12. A process for producing 2-phenyl-5-[p-(4,5-dihydro-2-imidazolyl)phenyl]furan hydrochloride which comprises reacting 2-phenyl-5-[p-(α-iminomethoxymethyl)phenyl]furan hydrochloride with ethylenediamine.

13. A process for producing 2-phenyl-5-[m-(4,5-dihydro-C-methyl-2-imidazolyl)phenyl]furan hydrochloride which comprises reacting 2-phenyl-5-[m-(α-iminomethoxymethyl)phenyl]furan hydrochloride with 1,2-diaminopropane.

14. A process for producing 2-phenyl-5-[p-(4,5-dihydro-C-methyl-2-imidazolyl)phenyl]furan hydrochloride which comprises reacting 2-phenyl-5-[p-(α-iminomethoxymethyl)phenyl]furan hydrochloride with 1,2-diaminopropane.

15. A process for producing 2-phenyl-5-[m-(1,4,5,6-tetrahydro-2-pyrimidyl)phenyl]furan hydrochloride which comprises reacting 2-phenyl-5-[m-(α-iminomethoxymethyl)phenyl]furan hydrochloride with 1,3-diaminopropane.

MOSES WOLF GOLDBERG.
ALBERT ISRAEL RACHLIN.

No references cited.